United States Patent
Smithson et al.

[11] Patent Number: 5,971,489
[45] Date of Patent: Oct. 26, 1999

[54] LOAD LIMITING DEVICE FOR A SEAT BELT

[75] Inventors: Alan Smithson; David Blackadder, both of Carlisle; John Taylor, Penrith; Andrew Downie, Carlisle; Joe Harte, Maryport; Andrew Park, Wigton; Elizabeth Rees, Carlisle, all of United Kingdom

[73] Assignee: Breed Automotive Technology, Inc., Lakeland, Fla.

[21] Appl. No.: 09/165,258

[22] Filed: Oct. 1, 1998

[30] Foreign Application Priority Data

Oct. 14, 1997 [GB] United Kingdom ............... 9721919

[51] Int. Cl.⁶ .................................................. B60R 22/28
[52] U.S. Cl. ........................ 297/472; 188/374; 280/805
[58] Field of Search .............................. 297/472; 188/371, 188/374, 376; 280/805

[56] References Cited

U.S. PATENT DOCUMENTS

| | | | |
|---|---|---|---|
| 3,026,972 | 3/1962 | Hendry et al. | 297/472 |
| 3,680,913 | 8/1972 | Seybold | 297/472 |
| 3,938,627 | 2/1976 | Nagazumi | 297/472 X |
| 4,027,905 | 6/1977 | Shimogawa et al. | |
| 4,358,136 | 11/1982 | Tsuge et al. | |
| 4,385,775 | 5/1983 | Shimogawa et al. | 297/472 |
| 4,978,139 | 12/1990 | Andres et al. | |
| 5,464,252 | 11/1995 | Kanazawa et al. | |

FOREIGN PATENT DOCUMENTS

| | | |
|---|---|---|
| 0297537 | of 1989 | European Pat. Off. |
| 0715997 | of 1996 | European Pat. Off. |
| 1237224 | of 1971 | United Kingdom |
| 1419301 | of 1975 | United Kingdom |

*Primary Examiner*—Anthony D. Barfield
*Attorney, Agent, or Firm*—Lonnie R. Drayer; Beth A. Vrioni

[57] ABSTRACT

A load limiting device is used with a vehicle seat belt during a crash to allow a limited and controlled forward motion of a vehicle occupant after the retractor has locked. The load limiting device decreases the forces exerted by the seat belt on the vehicle occupant's torso. The load limiting device has a metal member and means for deforming the metal member associated with the seat belt. Excessive load on the seat belt is transferred to the metal member by deforming the metal member.

1 Claim, 10 Drawing Sheets

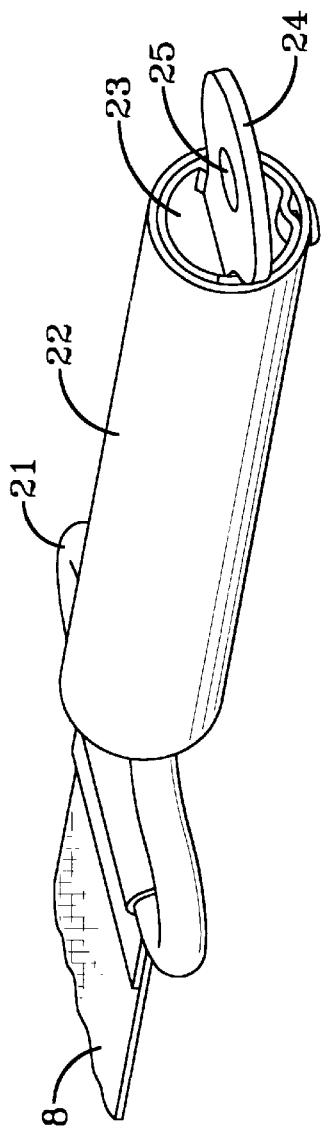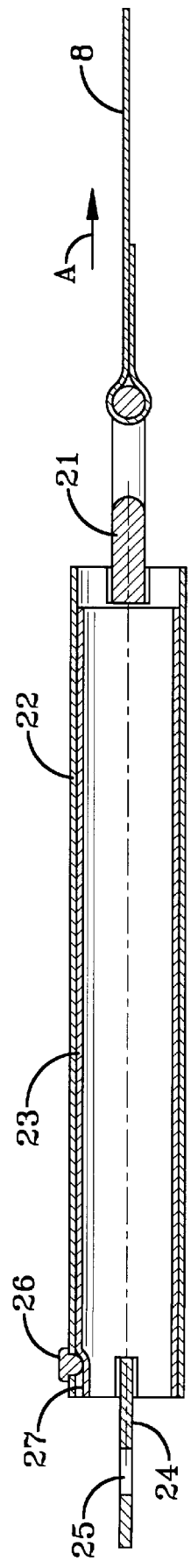

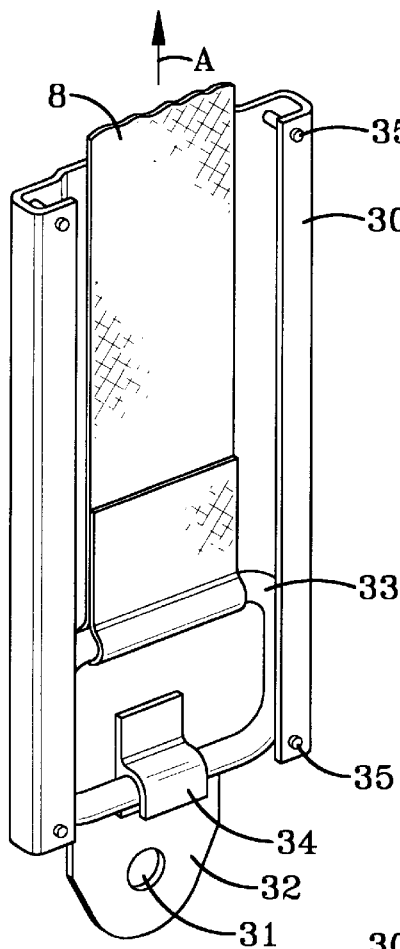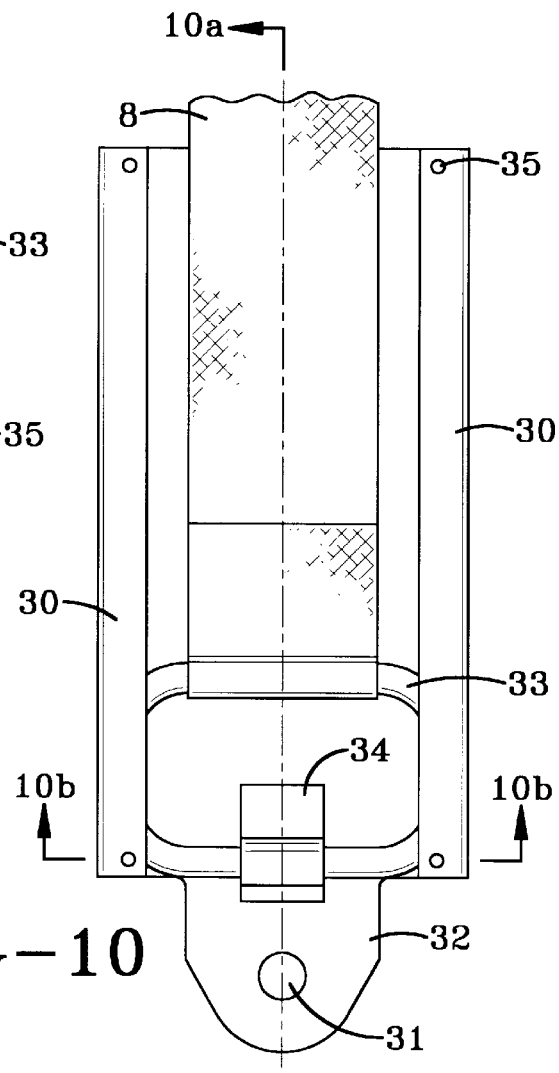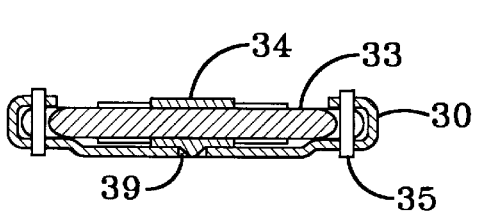
FIG-9
FIG-10
FIG-10a
FIG-10b

LOAD LIMITING DEVICE FOR A SEAT BELT

FIELD OF THE INVENTION

The present invention relates to a load limiting device for use in a vehicle with a seat belt.

BACKGROUND OF THE INVENTION

Modern seat belts comprise a length of webbing arranged to pass diagonally across the torso of a vehicle occupant and generally horizontally across the hip region of the vehicle occupant (the so-called lap portion of the belt). This is known as a three point belt system. One end of the belt webbing is firmly attached to a structural part of the vehicle, such as the floor, and the other end is attached to the spool of a retractor which itself is firmly attached to a structural part of the vehicle, usually the side B-pillar. The retractor automatically keeps any slack in the belt wound onto the spool and thus keeps tension in the belt. Between the retractor and the other fixed point, a fastening element such as a metal tongue is fixed to the belt webbing with which it can be fastened into a buckle which itself is attached to a fixed part of the vehicle on the other side of the vehicle seat.

A clock spring in the retractor allows pay out of webbing under the influence of relatively gentle forwardly directed inertia of the vehicle occupant, for example to allow for normal movement of the vehicle occupant such as reaching forward to activate in-car controls, glove compartments or door pockets.

In the event of a crash, the sudden high forward momentum of the vehicle occupant activates a crash sensor which locks the spool against rotation and prevents forward motion of the vehicle occupant to prevent him colliding with the internal fixtures of the vehicle such as the steering wheel, dashboard or windscreen.

However, it has been found in high velocity crashes that the sudden locking of the seat belt can itself cause injury to the vehicle occupant due to the sudden impact of the torso with the belt webbing.

In recent years it has been proposed to introduce a load limiting effect into the seat belt system so as to allow a limited and controlled forward motion of the vehicle occupant after the retractor has locked. This decreases the forces exerted by the belt on the vehicle occupant's torso.

DISCUSSION OF PRIOR ART

Load limiting proposals are described in EP 0297537 wherein a plastically deformable member is used in the retractor, and particularly between the spool and innermost winding of the belt webbing. Alternative load limiting proposals are known in which crushable bushings or nuts or deformable torsion bars are placed in the retractor in the force path between the spool locking mechanism and belt webbing. These proposals are complex and expensive and require the retractor to be specially designed and constructed to incorporate them.

Another proposal is described in EP 715997 in which a slotted metal plate is fixed to a seat belt anchorage point and the retractor is fixed to the plate so that, under load, it slides on the plate deforming the metal and dissipating energy. However, this requires expensive modifications to the retractor.

The present invention proposes improved, simpler and more cost effective load limiting arrangements for seat belts.

SUMMARY OF THE INVENTION

According to the present invention there is provided a load limiting device for use with a safety restraint having seat belt webbing connected to fixed parts of the vehicle and a buckle for fastening at least one point of the webbing to the vehicle, wherein the tension reducing device comprises a metal member associated with the safety restraint, and means for deforming the metal member, the deforming means being arranged to transfer load from the seat belt to the metal member.

Preferably one end of a metal strip is attached to a mounting anchorage for the buckle fastening of the seat belt. Alternatively, one end of the metal strip may be attached to a retractor mounting anchorage of the seat belt. Holes could be made to attach webbing.

According to one embodiment, a metal strip is a substantially planar member which is connected between a belt webbing anchorage and belt webbing and the deforming means comprises an accurate slot through which the metal strip is drawn, i.e. pulled or pushed to deform it into a curved shape when subjected to extreme forces. Alternatively, a bent piece of metal plate may be pulled through a substantially planar guide block so that the bent plate is bent into a substantially flat plate.

According to a second embodiment, a metal strip comprises cut-outs so as to form generally, a ladder shape with rungs, and the deforming means comprises a member engaging in the cut-outs of the metal strip to break or cut the rungs as it moves along the ladder under load. This embodiment may be incorporated into the buckle mechanism such that the tongue is formed in such a ladder shape and the buckle latch forms the deforming means.

According to a third embodiment, a metal strip may be deformed by a cam rotated by action of the protraction of the seat belt under extreme forces. The cam may be mounted to rotate with the retractor web-winding spool, for example attached to the spindle or shaft of the retractor spool. Alternatively, it may be attached at any point in the belt webbing force path such as to a winding axis of a member around which a length of webbing is wound.

In a fourth embodiment, a metal strip has one end attached to the spindle of a winding spool or bobbin, (which may be the retractor bobbin or may be another bobbin attached in the force path of the seat belt to rotate as the belt is withdrawn). As webbing is extracted under force the rotation of the bobbin causes the metal strip, preferably formed of steel, to be wound around the spindle of the bobbin.

According to another embodiment, a metal strip may be deformed by action of a roller pulled over the metal strip, or alternatively by means of a slider.

In a variation of this invention, two coaxially mounted tubes are arranged such that one is fixed to a mounting point of the seat belt and the other is subjected to forces on the seat belt and when one moves relative to the other under action of forces on the seat belt, one or the other is deformed, for example by means of a peg attached to one of the tubes and preferably a performed starter indentation in the other.

The metal member may be in a saddle shape, for example attached to a height adjuster such than an excessive load on the webbing causes the saddle to deform or causes the saddle to deform another part, for example the back of the frame of the height adjuster. This could also be done using a roller on the loop attached to the webbing in a height adjuster. Under normal conditions this roller would fit and slide easily in a groove and cutout in the back plate but under excessive load it will ride past the length of the groove and deform part of the back plate.

Alternatively, the deforming means may comprise rotating members with fins that deform a metal plate as it is pulled past the fins. Rotating wheels comprising fins could be mounted on both faces of the metal plate, or on one face with, for example, a toothed rack against the other face to form mandrel for bending the metal. Preferably the metal strip straightens out again after it has passed the deforming means in this embodiment.

The fins could instead comprise hole punching members. Again a mandrel, either in the form of a rotating wheel with holes corresponding in size and position to the punching member, or in the form of a rack with corresponding holes, will be provided.

BRIEF DESCRIPTION OF THE DRAWINGS

For a better understanding of the present invention, and to show how the same may be carried into effect, reference be made to the accompanying drawings.

FIGS. 7 and 8 illustrate in perspective and in cross-section, respectively, a further embodiment of the invention.

FIG. 9 is a perspective view of another embodiment of the invention.

FIG. 10 is a front plan view of the embodiment of FIG. 9.

FIGS. 10a and 10b show respective cross-sections of the embodiment of FIGS. 9 and 10.

DETAILED DESCRIPTION OF THE INVENTION

Figure 1:
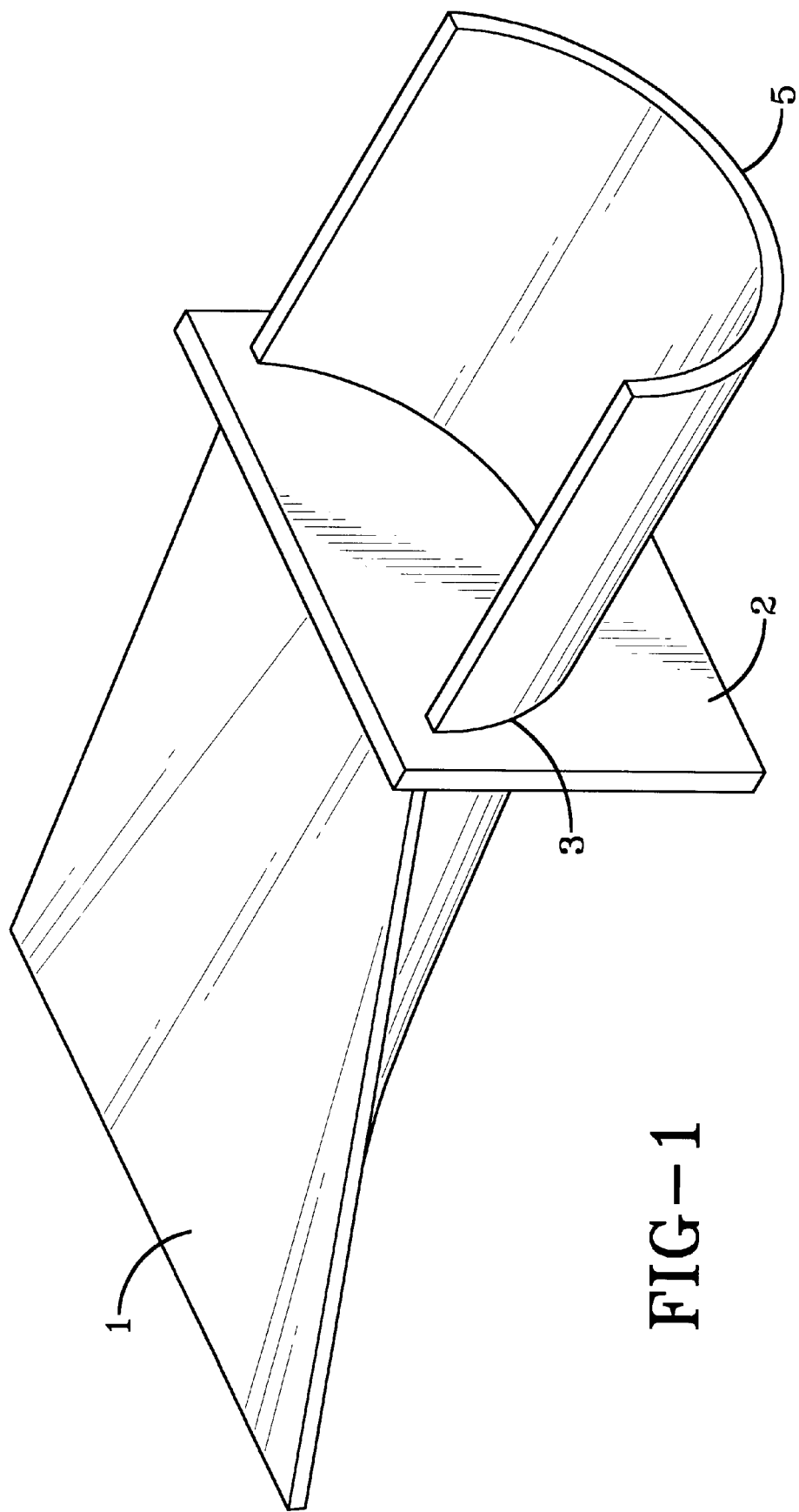
FIG. 1 is a perspective view of a first embodiment of the invention.

FIG. 1 illustrates a first embodiment of the invention in which a metal member in the form of a generally planar metal strip 1 is pulled through a die 2 which has a curved slot 3 to absorb energy of a safety belt system under high loads. Either the strip 1 or die 2 is attached to a fixed anchorage position on the vehicle. This may be at the buckle end or at the retractor end or at the sill mounting end of a standard three point seat belt. The other is attached to belt webbing or to a buckle or retractor mounting. As the strip 1 is pulled through the curved slot 3 in the die, the metal strip 1 deforms into the curved shape indicated at 5.

The embodiment is particularly easy and cheap to integrate into a vehicle. The flat metal strip 1 can easily be hidden under a seat or in other discrete places in the vehicle. Any combination of shapes is possible. It is not necessary to have a flat metal strip deformed into a curved shape: the opposite would work just as well.

Figure 2:
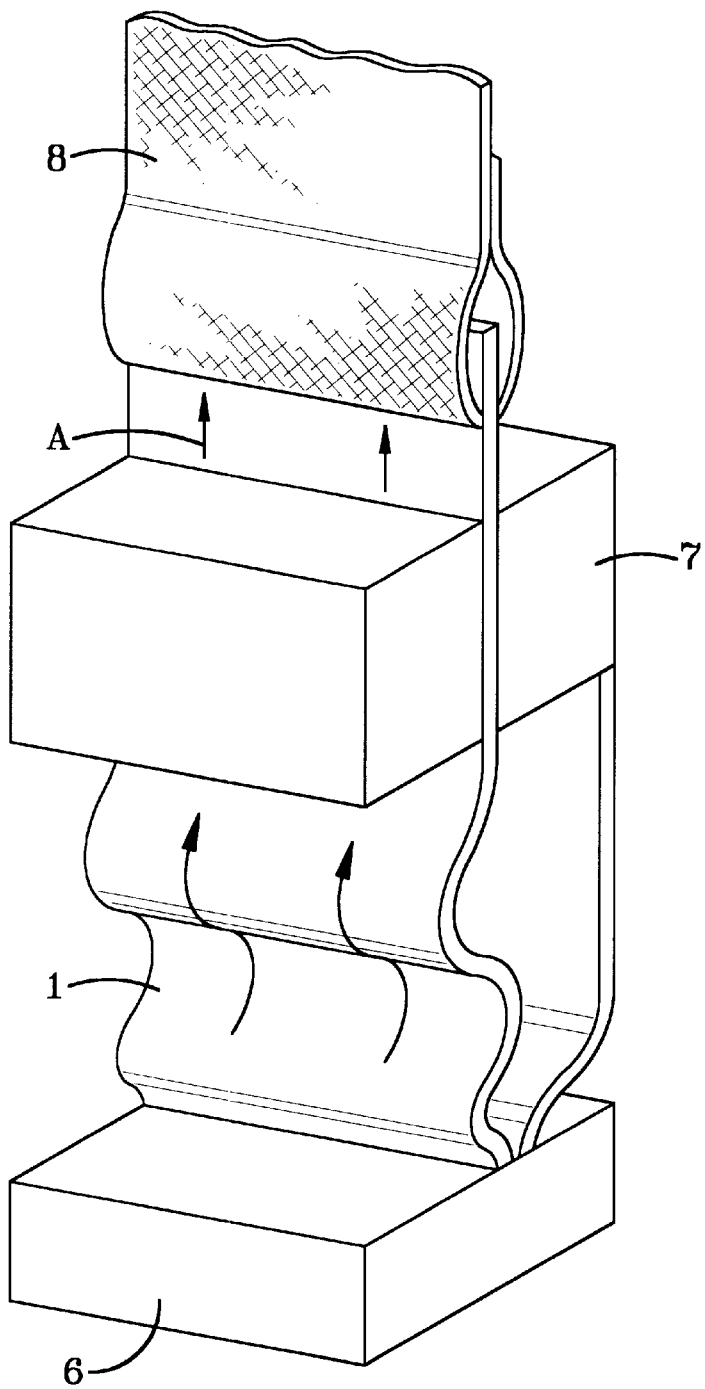
FIGS. 2 and 3 are perspective and side elevation views, respectively, of a second embodiment the invention.
Figure 3:
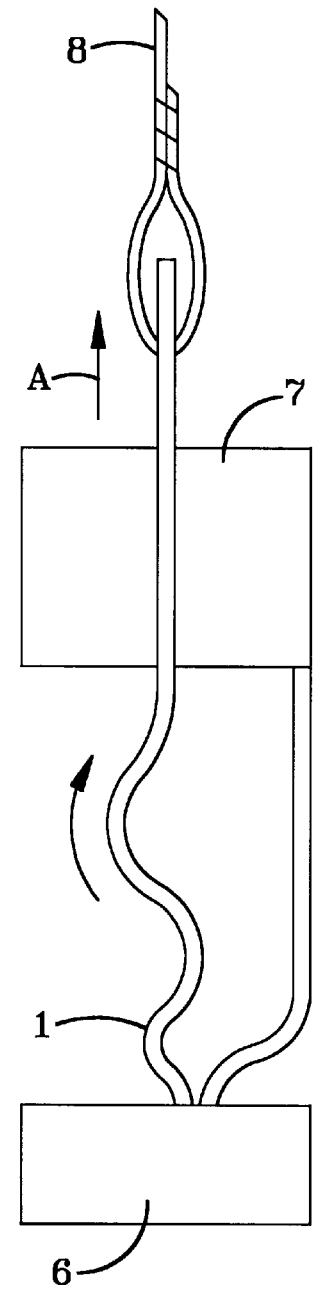

For example, in the embodiment of FIGS. 2 and 3 a bent metal strip 1, attached to a fixed anchorage point of the vehicle via block 6, is pulled through straightening guide blocks 7 in the direction indicated by the arrows A. The guide blocks 7 flatten out the curves in metal strip 1 thus absorbing some of the energy of the system. The upper end of metal strip 1 is attached to seat belt webbing 8.

Figure 4:
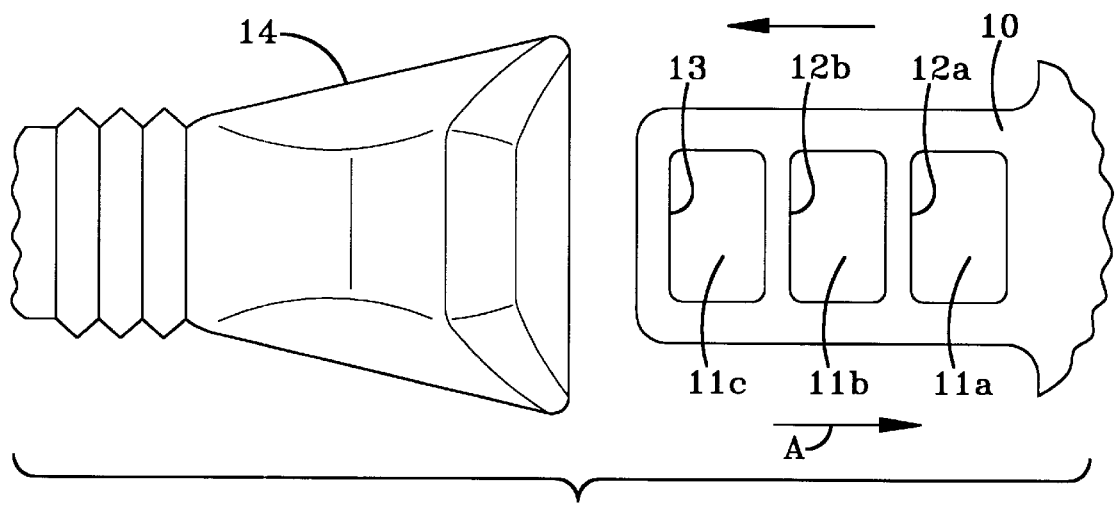
FIG. 4 is a top plan view of another embodiment of the invention.

In the embodiment of FIG. 4 a buckle tongue plate 10 performs the load limiting function. The buckle tongue plate 10 is a metal strip having a series of cutouts 11 that leave cross beams 12 in a form of ladder structure. The tongue plate 10 is inserted into a buckle head 14 so as to secure the safety belt around the vehicle occupant. Within the housing of the buckle head 14 is a latch member (not shown) which engages into a first cut out 11a on the tongue plate 10 and, under normal use, is retained in the first cut-out 11a by virtue of the lateral bar 12a. Under conditions of extreme load, a first lateral bar 12a will break thus absorbing some of the energy. A second lateral bar 12b will also break if the load applied to it is high enough, i.e. if enough energy has not already been absorbed by the first lateral bar 12a breaking. However, a third lateral bar 13 is constructed to be stronger than the first and second bars 12a and 12b. The third lateral bar may be made of a different, stronger material or may be made of different dimensions to make it stronger. It is, of course, imperative that the last bar 13 does not break, even under conditions of extremely high load so that the vehicle occupant is safely restrained. Preferably some form of plastic coating or similar arrangement is put over the cut-outs 11b and 11c to ensure that the buckle does not falsely engage in these cut-outs in normal use since this would limit the load limiting effect.

Figures 5, 6:
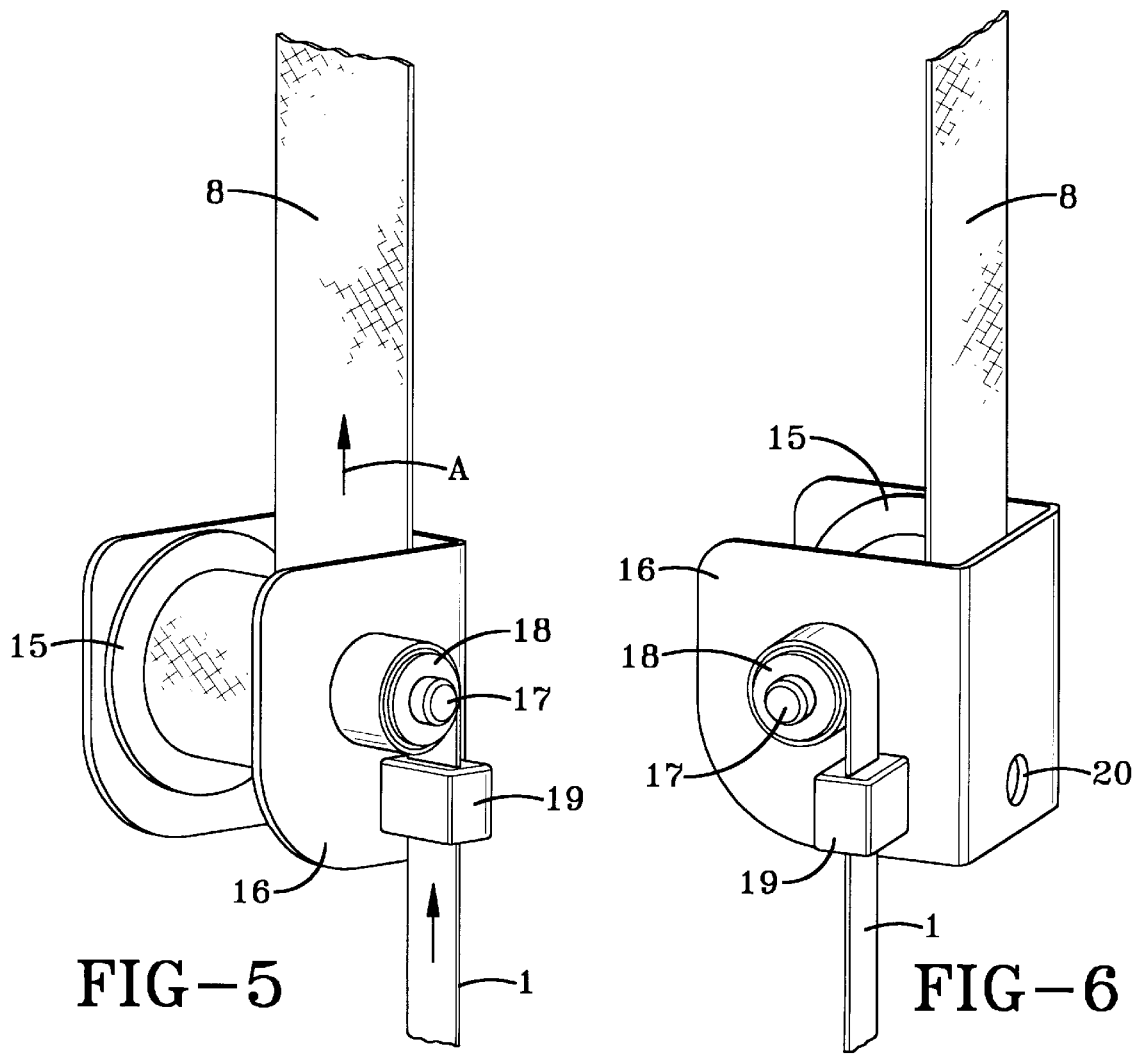
FIGS. 5 and 6 are right side and left side perspective views, respectively, of yet another embodiment of tie invention.

FIGS. 5 and 6 illustrate another embodiment of the invention. Seat belt webbing 8 is wound around a spool 15 that is mounted for rotation in a frame 16 on a spindle 17. Mounted on the spindle 17 on one side of the frame 16 is a bobbin 18. A metal strip 1 passes through a strip guide 19, which is a die, and is fixed to the outer periphery of the bobbin 18. Under conditions of high load, the belt webbing 8 is pulled in the direction indicated by arrow A, causing the spool 15 to rotate in a counter-clockwise direction. This in turn, rotates the spindle 17 and thus the bobbin 18 and the metal strip 1 is wound onto the bobbin 18 is an anti-clockwise direction. This absorbs some of the peak energy of a crash; i.e. it flattens out the crash pulse and reduces the possibility of injury to the vehicle occupant.

The spool 15 may be part of a retractor or alternatively may be an independent spool mounted at another point in the seat belt system. It could be mounted via its frame 16, to the buckle anchorage point or to the sill via mounting hole 20.

FIGS. 7 and 8 illustrate another embodiment of the invention wherein seat belt webbing 8 is connected to a metal loop 21 which is integrally connected to an outer tube 22. An inner tube 23 is connected via a hole 25 in a plate 24 to an anchorage point of the vehicle (not shown). The two tubes 22 and 23 are fit together tightly, but can slide relative to each other. A peg 26 is fixed to the outside tube and projects into the surface of the inside tube. At the end of the inside tube 23, a preformed starter indentation 27 is made.

When a load is applied to the webbing 8 in the direction indicated by arrow A, then the outside tube 22 is pulled past the inside tube 23 and the peg 26 deforms the surface of the inside tube 23, thus dissipating energy.

FIGS. 9 and 10 illustrate another embodiment that may be used at a shoulder mounting point or a sill end or indeed at a buckle end wherein it could be easily hidden under a seat. This could thus be used as a webbing buckle or retractor attachment. A frame 30 is mounted to the appropriate anchorage point via mounting hole 31 in a bracket 32 at one end of the frame 30. Seat belt webbing 8 is attached to a loop or ring 33 that is held in the fork of a saddle 34. This saddle 34 sits in a slot in the frame 30 in normal use. Retaining stops or pins 35 are located at both ends of the frame 30 to prevent the webbing 8 being pulled completely out of the anchorage. Under high loads on the webbing 8 the loop 33 exerts a high force on the saddle 34 which slides in the slot 39 in the frame 30 and at the end of the slot 39 in the frame 30 and at the end of the slot 39 will deform the back plate of the frame 30 In the cross-sectional views of FIGS. 10, 10a and 10b, like numerals are used for like parts.

Figures 11, 12, 12A:
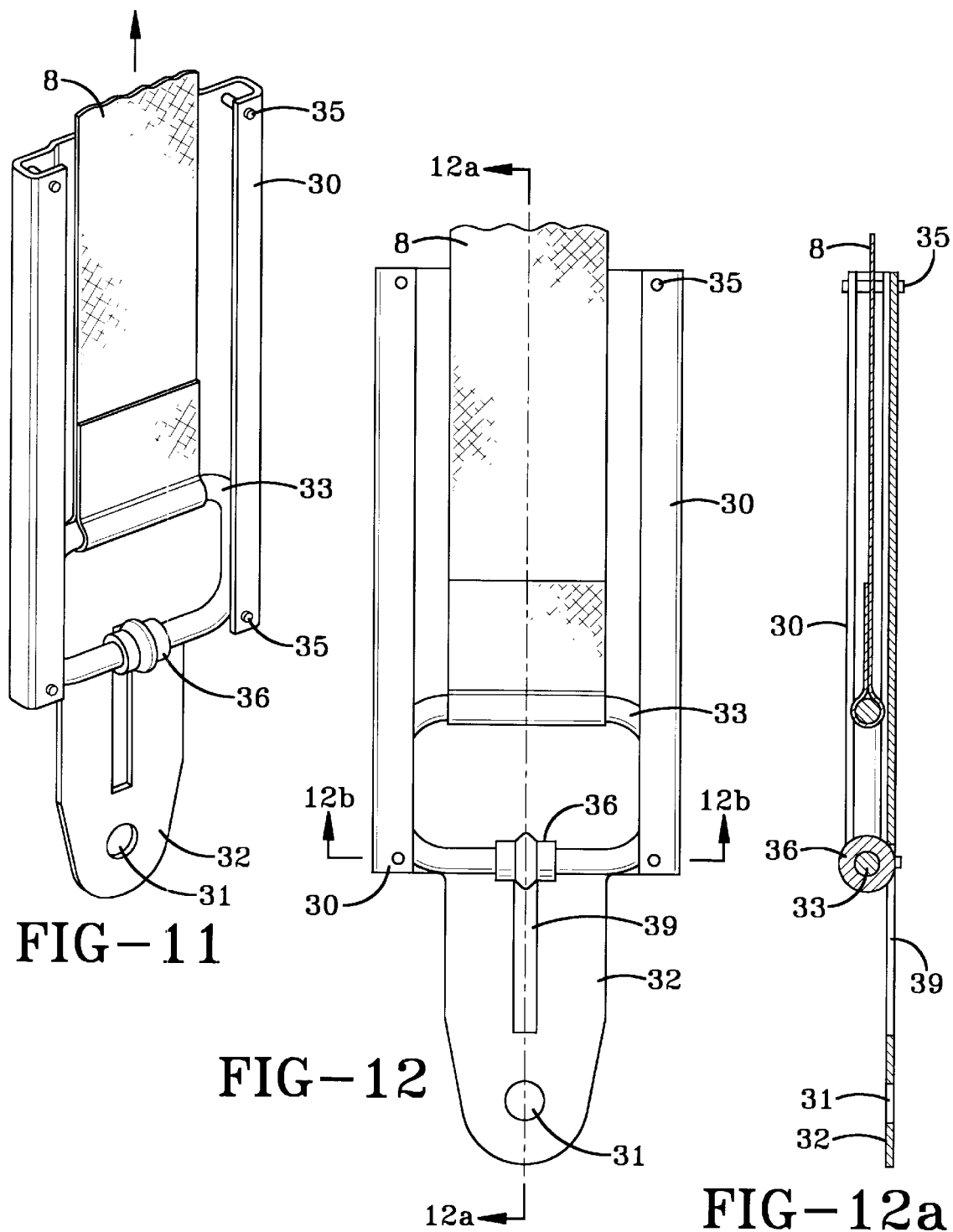
FIG. 11 is a perspective view of another embodiment of the invention.
FIG. 12 is a front plan view of the embodiment of FIG. 11.
FIGS. 12a and 12b are respective cross-sections of the embodiment of FIGS. 11 and 12.
Figure 12B:
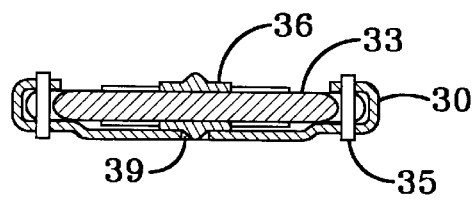

FIGS. 11 and 12 illustrate a similar embodiment to FIGS. 9 and 10 except that instead of the slide being attached to the saddle 34, a roller 36 is mounted on the lower arm of the loop or ring 33 and is used to deform the back plate of frame 30.

Figure 13:
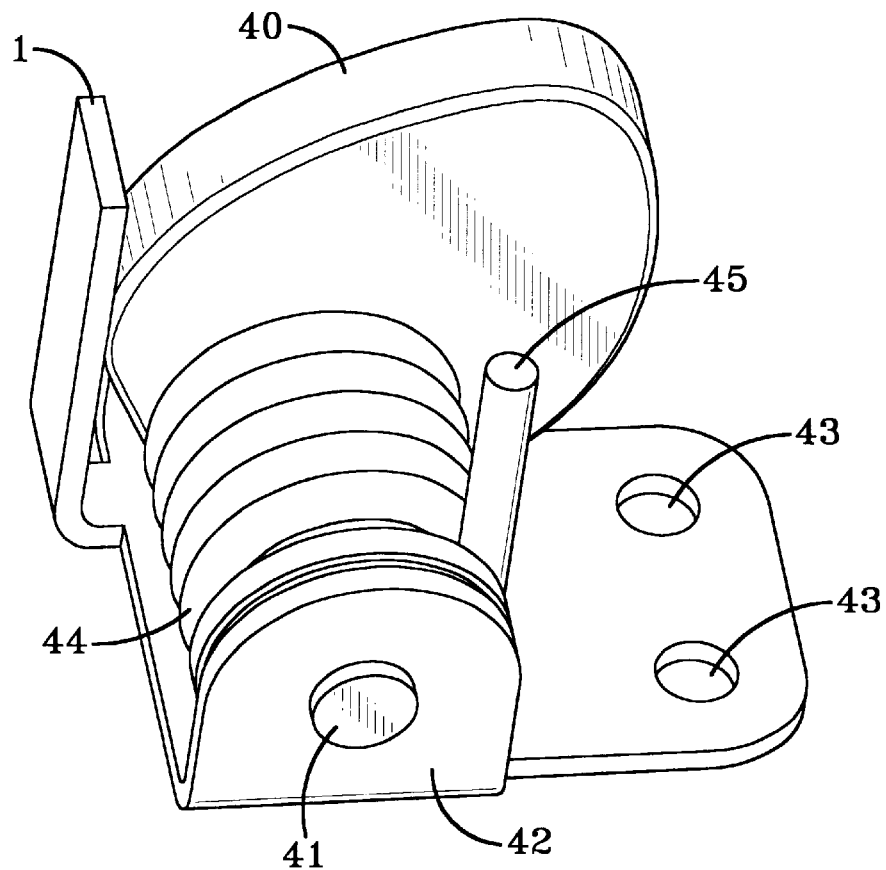
FIG. 13 is a perspective view of yet another embodiment of the invention.

FIG. 13 illustrates another embodiment in which an eccentric cam 40 rotates to bend a metal strip 1. The eccentric cam 40 is mounted to rotate with a roller 41 mounted on a frame 42. The frame 42 is mounted to an anchorage point of the belt or the buckle via mounting holes 43. Attached to and wound around the roller 41 is a cable 44. The other end 45 of the cable 44 is attached to seat belt webbing or to a buckle to take the load exerted on the belt. Under load the cable 44 unwinds from the bobbin 41, rotating the bobbin and thus the eccentric cam, and deflecting and deforming the metal plate 1 (which may be a spring leg of the frame 42).

Figure 14A:
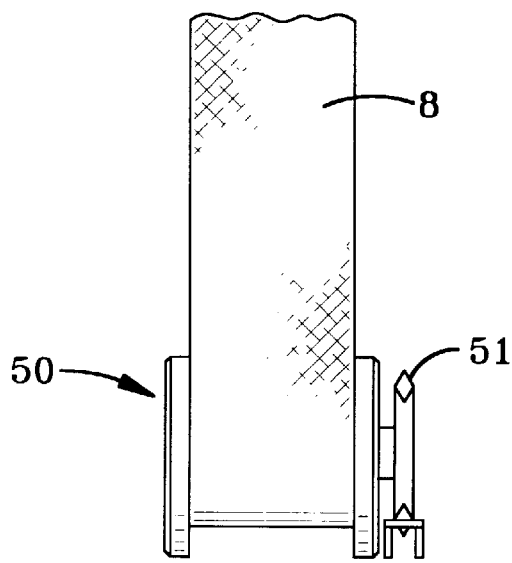
FIGS. 14A and 14B illustrate in rear elevation and side view, respectively, another embodiment of the invention.
Figure 14B:
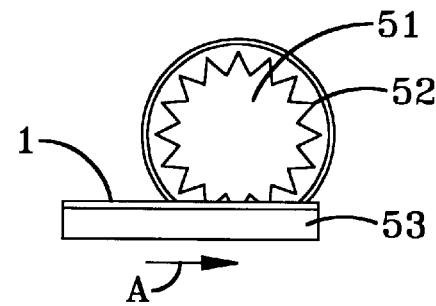

FIGS. 14A and 14B illustrate another embodiment, in which rotation of a spool 50 (which may be the retractor spool or another bobbin with some webbing wound on it) causes a cutting wheel 51 to rotate, driving teeth 52 into metal strip 1, so as to deform or cut the metal strip 1. The metal strip 1 is mounted on a carriage 53 that moves in the direction of arrow A when the belt webbing 8 is under load. The metal strip 1 can be sheared or split to dissipate energy.

Figure 15:
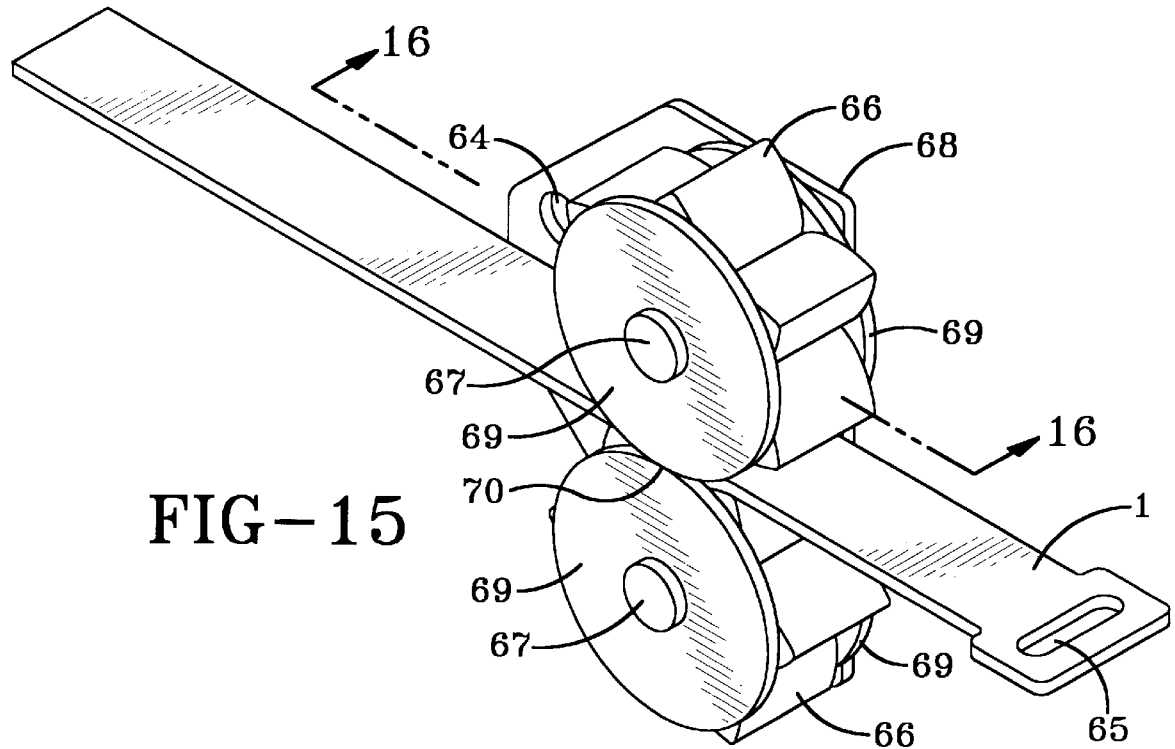
FIGS. 15 and 16 illustrate in perspective and in side elevation cross-section, respectively, another embodiment of the invention.
Figure 16:
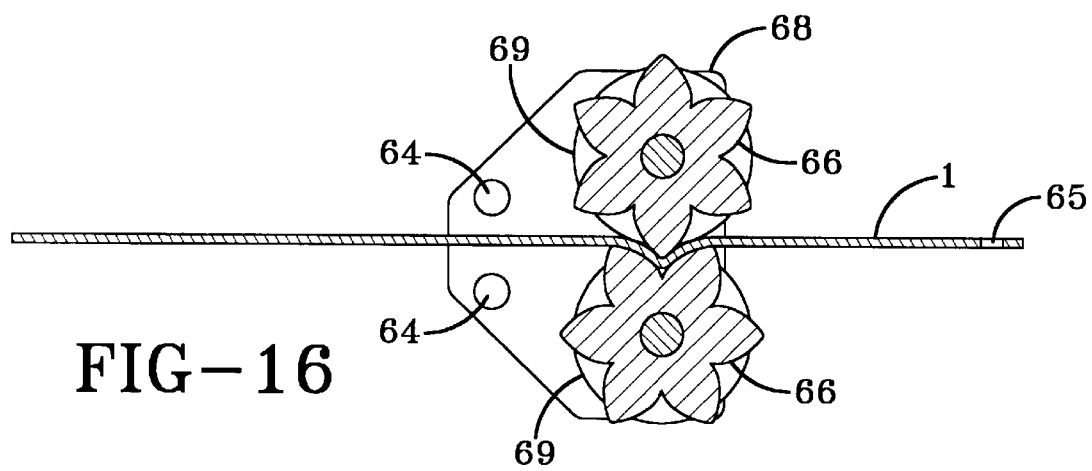

Another embodiment is shown in FIGS. 15 and 16. In this embodiment the metal strip 1 (which is preferably steel) strip 1 is deformed by rotating teeth on a wheel which may be formed by the intermeshing elements of gear wheels. Two gear wheels 66 are mounted one on either face of the metal strip 1 on bearing pins 67 fixed to a mounting frame 68. The mounting frame is fixed to a fixed part of the vehicle via mounting holes 64 (FIG. 16).

The wheels 66 have radically extending arms somewhat in the form of gear teeth and these are arranged to intermesh with each other on either side of the metal strip 1 so as to deform the metal strip into the spaces between the gear teeth on first one and then the other of the gear wheels 66, as shown most clearly in FIG. 16. The metal deforms as it passes between the gear teeth but straightens out as it passes out again and is subject to the full load on the webbing or the buckle attachment at 65. Guide flanges 69 are provided on both sides of each of the gear wheels 66 and these meet as shown at 70 to synchronize the rotation of the gears.

Figure 17:
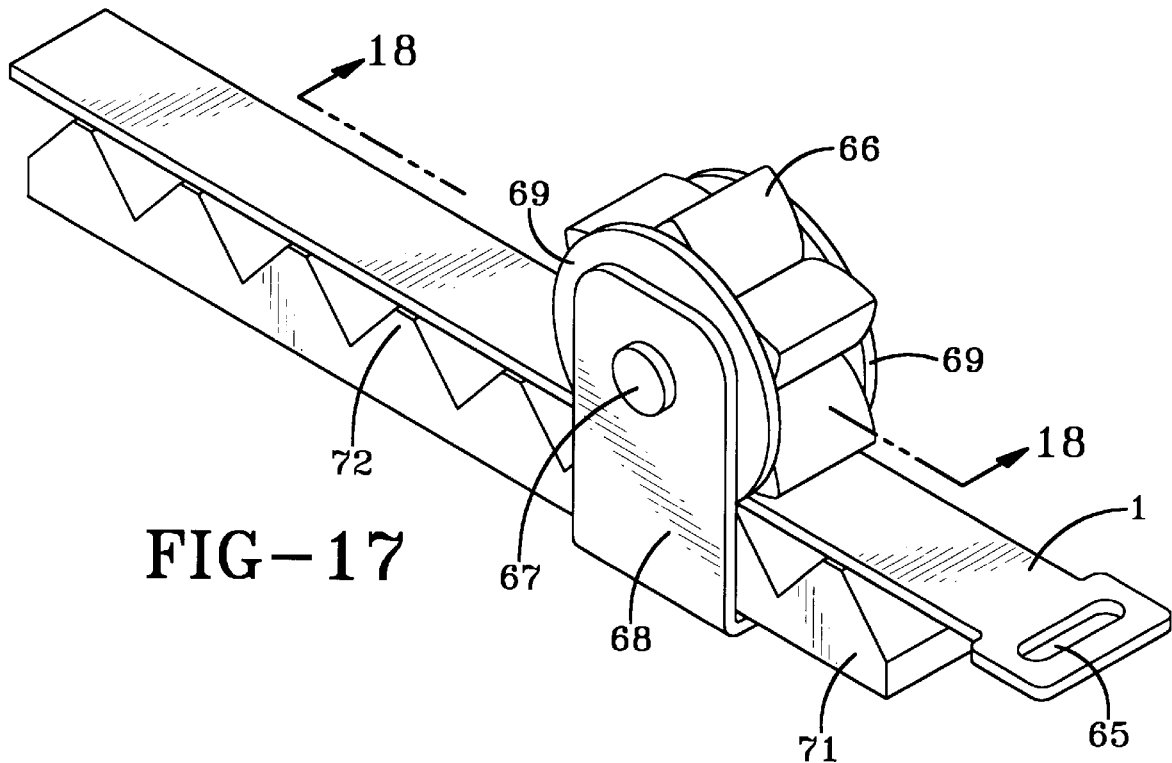
FIGS. 17 and 18 illustrate in perspective and in side elevation cross-section, respectively, another embodiment of the invention.
Figure 18:
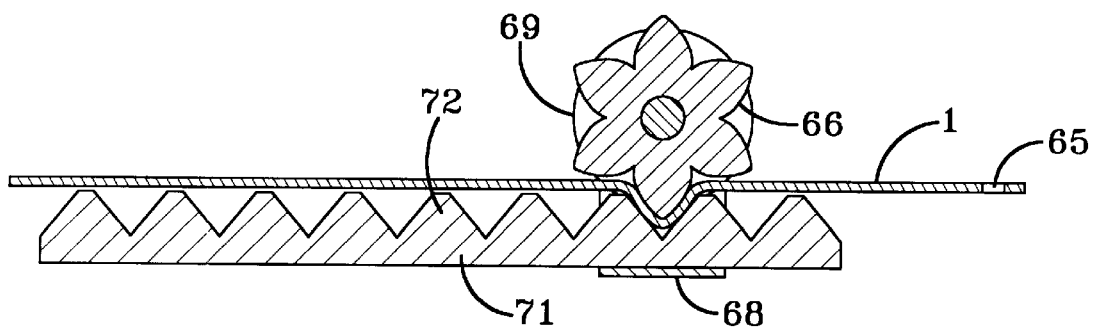

In the embodiment of FIGS. 17 and 18 the metal strip 1 is deformed by a gear wheel 66 against a toothed mandrel (rather than against another rotating gear wheel). Like parts are referenced with like reference numbers. The mandrel 71 has upstanding teeth 72 against which the metal strip will pass. Again, the metal strip 1 is deformed as it passes the gear wheel 66 but straightens out again when subjected to the full force of the pull on the webbing or buckle mounting point at 65. The rack moves as the gear rotates.

Figure 19:
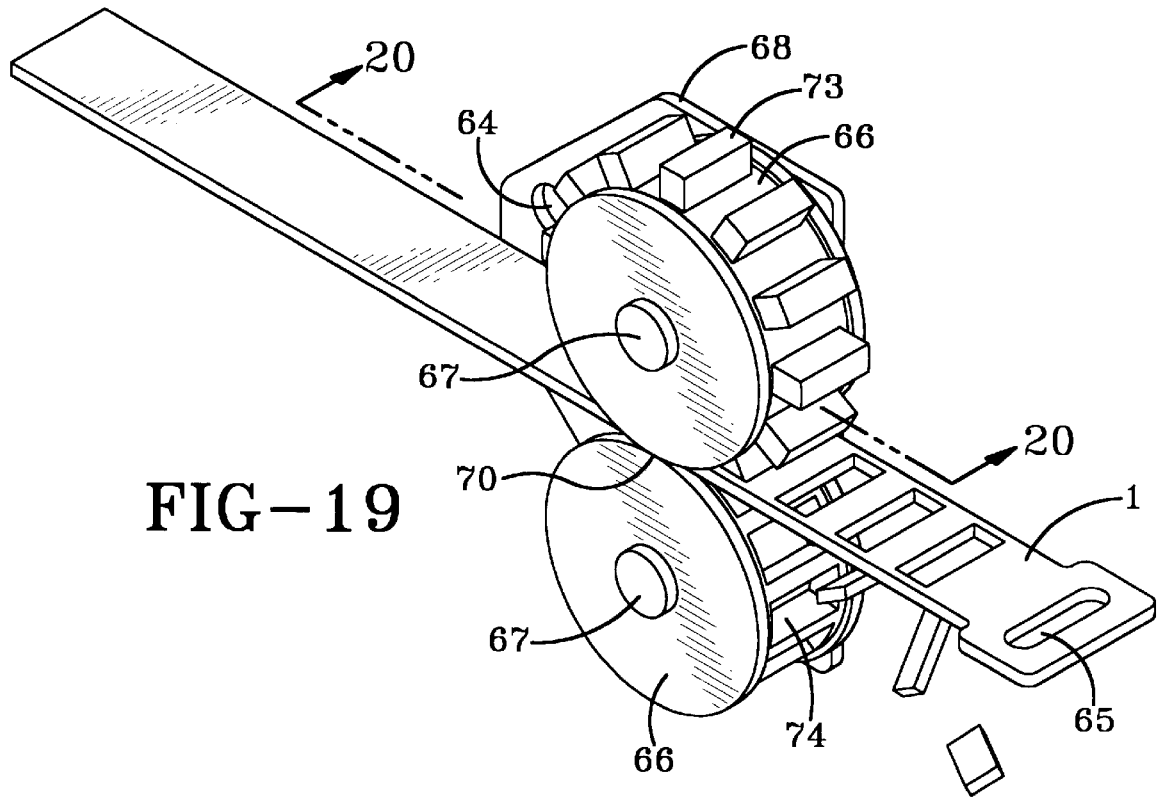
FIGS. 19 and 20 illustrate in perspective and in side elevation cross-section, respectively, another embodiment of the invention.
Figure 20:
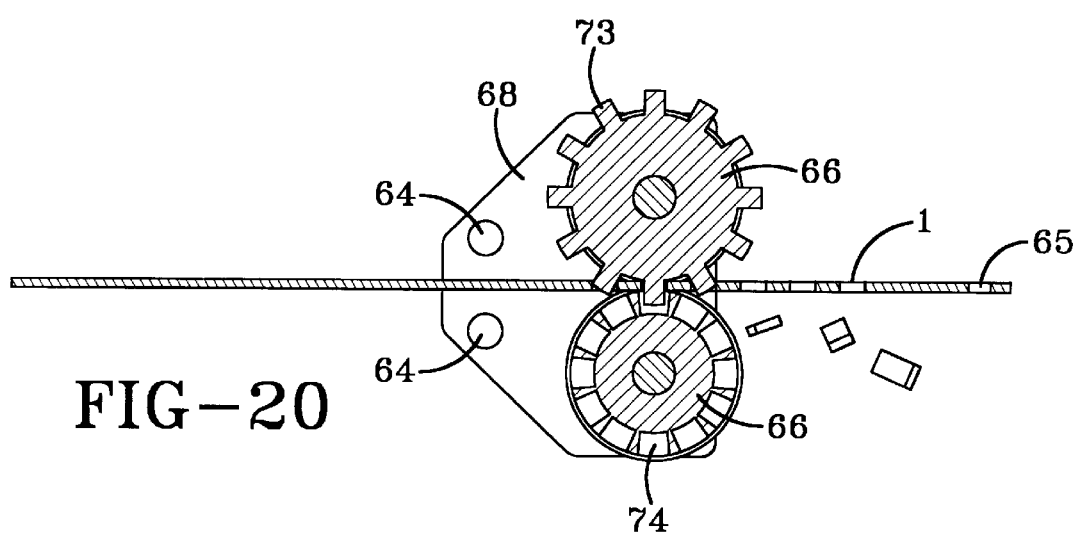

In FIGS. 19 and 20 a further development of this concept is shown in which the gear teeth are arranged to punch out holes in the metal strip 1. Again, like parts are referenced accordingly. In this case one of the gear wheel has radically extending punching teeth 73 while the other has radically indented holes 74 to form a punching mandrel for the punching holes 73. Of course, the female punch wheel could be replaced by holed rack that would move along as load limiting progresses.

From the foregoing, it will be apparent to those skilled in the art that modifications may be made without departing from the spirit and scope of the invention. Accordingly, the invention is not intended to be limited except as may be made necessary by the appended claims.

We claim:

1. A load limiting device for use with a seat belt wherein the load limiting device comprises: a first tubular metal member connected to a seat belt webbing, and a second tubular metal member adapted to be connected to an anchorage point on a vehicle, the two tubular members being coaxially arranged to fit together tightly and slide relative to each other, a peg is fixed to an outer surfacing of one of the tubular members and projects onto an outer surface of the other tubular member such that when a sufficient load is applied to the seat belt webbing the tubular members are longitudinally displaced relative to one another and the peg deforms the outer surface of one of the tubular members for dissipating energy.

* * * * *